(No Model.)

A. JENSEN.
DEVICE FOR HANDLING CANS, &c.

No. 600,004. Patented Mar. 1, 1898.

WITNESSES:

INVENTOR
A. Jensen.
BY
ATTORNEYS.

UNITED STATES PATENT OFFICE.

ASMUS JENSEN, OF LOUISVILLE, KENTUCKY.

DEVICE FOR HANDLING CANS, &c.

SPECIFICATION forming part of Letters Patent No. 600,004, dated March 1, 1898.

Application filed June 8, 1897. Serial No. 639,878. (No model.)

*To all whom it may concern:*

Be it known that I, ASMUS JENSEN, of Louisville, in the county of Jefferson and State of Kentucky, have invented a new and Improved Device for Handling Cans and other Articles, of which the following is a full, clear, and exact description.

The object of the invention is to provide a simple, durable, and economic device, especially adapted for taking articles of merchandise—such as cans, jars, buckets, and the like—from supports beyond ordinary reach.

A further object of the invention is to so construct the device that when an article, such as a jar or can, is grasped through the medium of the device the article may be held firmly between the jaws of the device and safely and conveniently conveyed to any desired place, and whereby, further, any article having a bail or a handle may be as readily taken from an overhead support or a support beyond ordinary reach and as safely manipulated.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
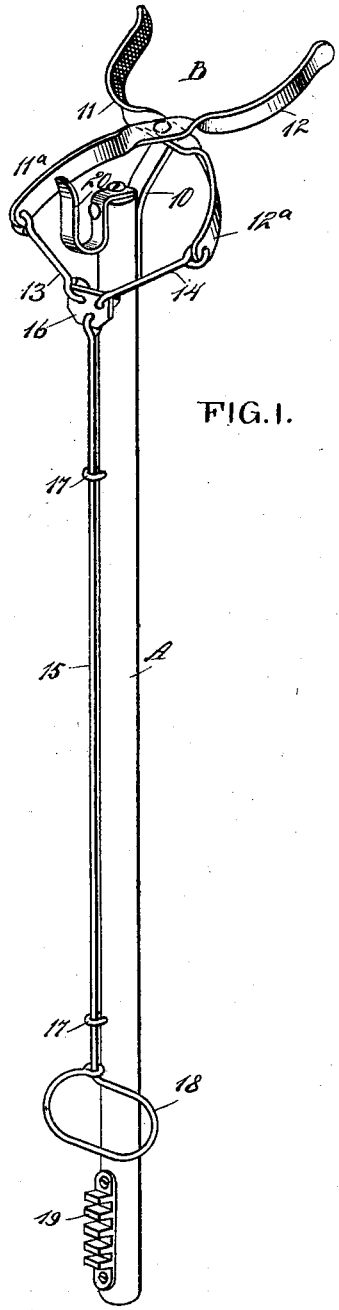
Figure 2:
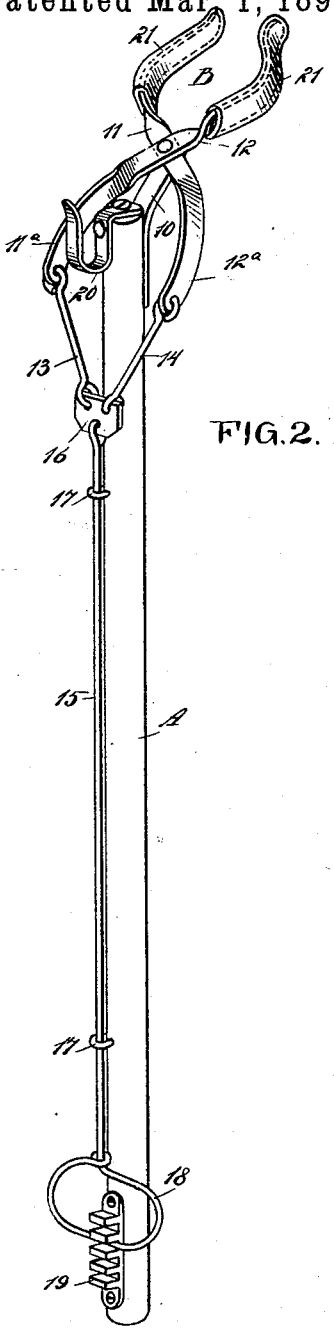

Figure 1 is a perspective view of the improved tool, illustrating the jaws as open; and Fig. 2 is a perspective view of the tool, illustrating the jaws as closed to a certain extent and locked in their closed position.

A pole A is employed, which may be of any desired length or may be made of any suitable material, and the said pole is provided at the top with a bracket 10, and the said bracket may be so shaped as to hold a tongs B either at an angle to the pole or in a perpendicular position, as required. The jaws of the tongs, which are designated as 11 and 12 and are pivotally connected, are each provided with a shank, designated, respectively, as 11ª and 12ª. A link 13 is connected with the shank of one jaw, while a link 14 is connected with the shank of the opposing jaw. The jaws are operated through the medium of a pull-rod 15, the said rod being connected at its upper or outer end to a plate 16, to which plate the links 13 and 14 are likewise pivotally attached, or the rod 15 may be connected directly to the links. The pull-rod 15 is held to slide through guides 17, attached to the pole A, the rod terminating at its inner or lower end in a handle 18, which is preferably in the form of a loop. A rack 19 is secured upon the lower portion of the pole A, adapted to receive between its teeth a member of the aforesaid handle 18, and thereby hold the jaws 11 and 12 firmly in the position to which they may be carried.

The inner faces of the jaws are usually roughened, as shown in Fig. 1; but the jaws may be covered with a yielding material 21, such as rubber or leather, so as not to injure any fragile article they may be made to grasp. A hook 20 is secured to the top of the pole A or near the top between the shanks of the jaws of the tongs, the said hook being utilized to receive the bail or handle of an article that is to be taken from a support ordinarily beyond reach.

In operation the handle 18 of the pull-rod is diconnected from the rack 19 and carried outward, so as to separate the jaws of the tongs. The said jaws are then made to receive between them the can, jar, or other article to be removed and are drawn together in a manner to grasp the said article by drawing downward or inward the pull-rod 15, and by causing the handle of the pull-rod to engage with the rack the jaws of the tongs will be held firmly in engagement with the said jar or can. The jar or can may then be safely removed from its support and carried by means of the improved tool or device to any desired place. In the event it is desired to remove a bucket or an article having a handle from an overhead support or to take the same to a shelf, the hook 20 may be brought into requisition.

Having thus described my invention, I claim as new and desire to secure by Letters Patent—

1. The combination with the pole, of a bracket at one end thereof, tongs pivotally connected together and mounted upon said bracket, a link pivotally connected to each shank of said tongs, a pull-rod pivotally connected with said links, the said rod terminating at the lower end in a loop 18, and a rack 19 attached to the other end of said pole and arranged to receive the said loop 18, as and for the purpose set forth.

2. A device of the character described, consisting of a pole, a bracket attached to one end of said pole, tongs pivotally connected together and mounted upon said bracket, a link attached to each shank of said tongs, a plate to which the ends of said link are pivotally connected, and a pull-rod arranged for sliding movement upon said pole, one end of said pull-rod being attached to said plate and the other end being arranged for adjustable locking engagement with said pole, as and for the purpose set forth.

3. The herein-described device for handling cans or the like, consisting of the pole, a bracket 10 extending from one side of said pole and at the end thereof, tongs mounted upon said bracket, links pivotally connected to the shanks of said tongs, a plate 16 pivotally connecting said links together upon the side of said pole opposite to that upon which the tongs are located, a pull-rod 15 attached at one end to said plate and arranged for longitudinal movement upon said pole, the other end of said rod being formed into a loop or handle, and a rack 19 upon the lower end of said pole and arranged to receive said loop to hold the same, as and for the purpose set forth.

ASMUS JENSEN.

Witnesses:
AUGUST JENSEN,
ROBERT F. R. MENAH.

It is hereby certified that in Letters Patent No. 600,004, granted March 1, 1898, upon the application of Asmus Jensen, of Louisville, Kentucky, for an improvement in "Devices for Handling Cans, &c.," an error appears in the printed specification requiring correction, as follows: On page 1, the words " electrical circuit having a solenoid, a rheo-" comprising line 11 should be stricken out; and that the said Letters Patent should be read with this correction therein that the same may conform to the record of the case in the Patent Office.

Signed, countersigned, and sealed this 29th day of March, A. D., 1898.

[SEAL.]                                                                 WEBSTER DAVIS,
*Assistant Secretary of the Interior.*

Countersigned:
   C. H. DUELL,
      *Commissioner of Patents.*